July 17, 1928.

G. E. POWELL

1,677,846

LAND AND WATER VEHICLE

Original Filed July 28, 1926   5 Sheets-Sheet 3

INVENTOR
George E. Powell.
BY
ATTORNEYS

Patented July 17, 1928.

1,677,846

UNITED STATES PATENT OFFICE.

GEORGE E. POWELL, OF CHICAGO, ILLINOIS, ASSIGNOR OF ONE-HALF TO ELMER E. SHUGART, OF COUNCIL BLUFFS, IOWA.

LAND AND WATER VEHICLE.

Application filed July 28, 1926, Serial No. 125,507. Renewed May 25, 1928.

This invention relates to a land and water vehicle and one of the principal objects resides in the provision of a vehicle of this character which has all of the advantages of an automobile in respect to travel over land and all of the advantages of a motor boat in respect of travel over water.

Another object of the invention is to provide a vehicle of this character which may be used as an automobile on land and run into the water and used as a motor boat and likewise run out of the water and used as an automobile without making any alterations in the device and without the necessity of the operator leaving his seat. Where the vehicle is to be used as a boat over a long period as, for instance, in making a somewhat extended trip it may be converted into a boat of strictly standard characteristics, the equipment which makes the device capable for use as a land vehicle being removed. This conversion of the land and water vehicle to a conventional boat structure is carried out without the necessity of disturbing or making any water tight joints, the necessary water tight joints remaining undisturbed in all uses of the boat. The design of the hull of the boat and of the land running gear and the organizations of these parts is such that the removal and replacement of the land running gears is an operation requiring but little effort, the expenditure of a small amount of time and the exercise of little or no mechanical skill. The running gear has the form of two major units, each being detachable as a whole from the hull of the boat and upon being dismantled stowed away in the boat if this is desired. The features of the design of the boat or rather of the hull thereof which co-act with the land running gear to facilitate removal and replacement thereof also operate to facilitate the movement of the boat through the water and tend to make it more sea-worthy.

Another object resides in the provision of a running gear for the boat which makes it capable for use as a land vehicle without straining or twisting the hull and while endowing the vehicle with stability and precluding the overturning or capsizing of the same on land even when rounding a curve. This same running gear construction is so connected and organized with the hull that when the boat is in the water with the running gear thereon the running gear will be suspended evenly on the boat to keep the boat on even keel.

Another feature resides in the provision of a running gear of such a character that the steering wheels employed to determine the course or direction of travel of the vehicle on land serve also as rudders in the water.

A further object is to provide a land and water vehicle of this character in which the propellers are so mounted on the hull and in which the hull is of such construction that liability of contact of the propellers with the road is precluded when the vehicle is being used on land.

A further object is to provide a land and water vehicle wherein provision is made for protecting the running gear designed especially for use on land from the action of the water.

Another object resides in the provision of a novel form of hull construction embodying features which provide a strong and rigid bed for the engine, transmission and associated parts and makes it possible for the hull to maintain its shape when beached or when in use as a land or water vehicle.

Other objects and advantages reside in certain novel features of the construction, arrangement and combination of parts which will be hereinafter more fully described and particularly pointed out in the appended claims, reference being had to the accompanying drawings forming a part of this specification, and in which:—

Figures 7, 8:
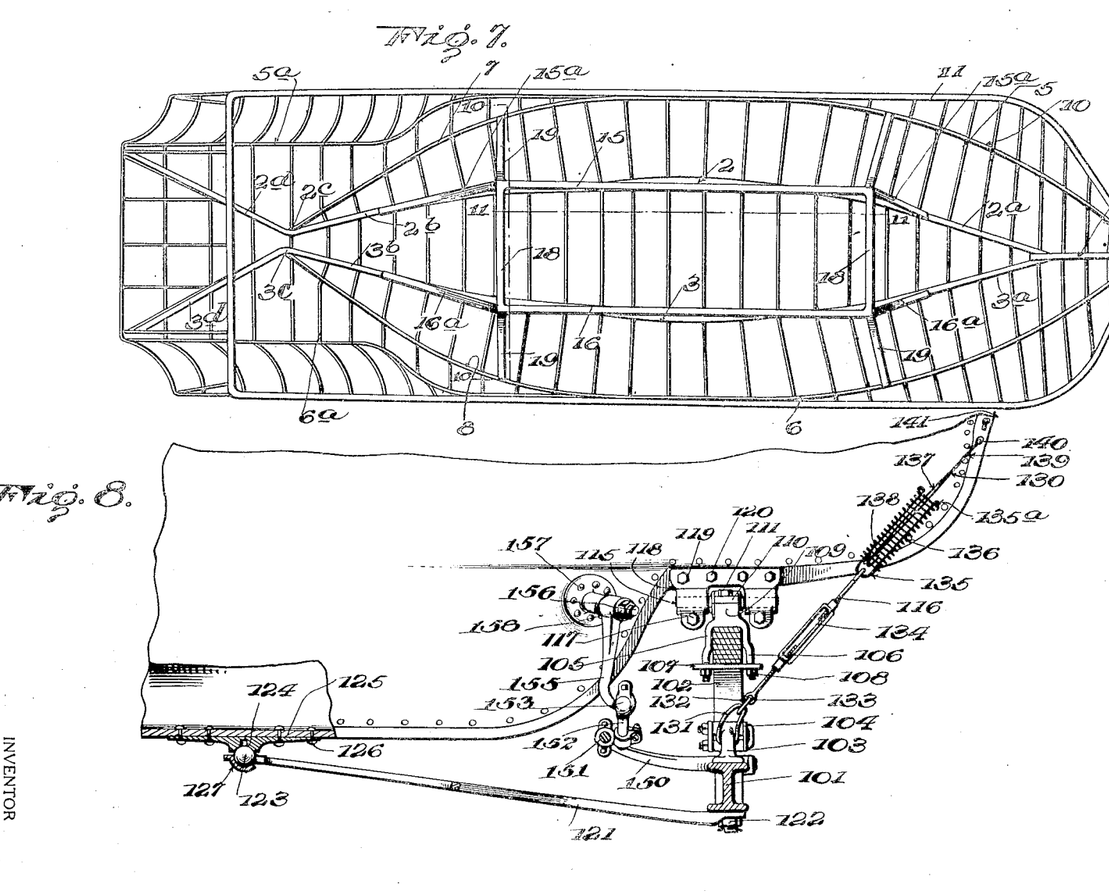
Figure 7 is a plan view showing the hull construction.
Figure 8 is a fragmentary detail view partly in section and partly in side elevation illustrating the connection of the front wheels of the running gear to the hull.
Figures 9, 10:
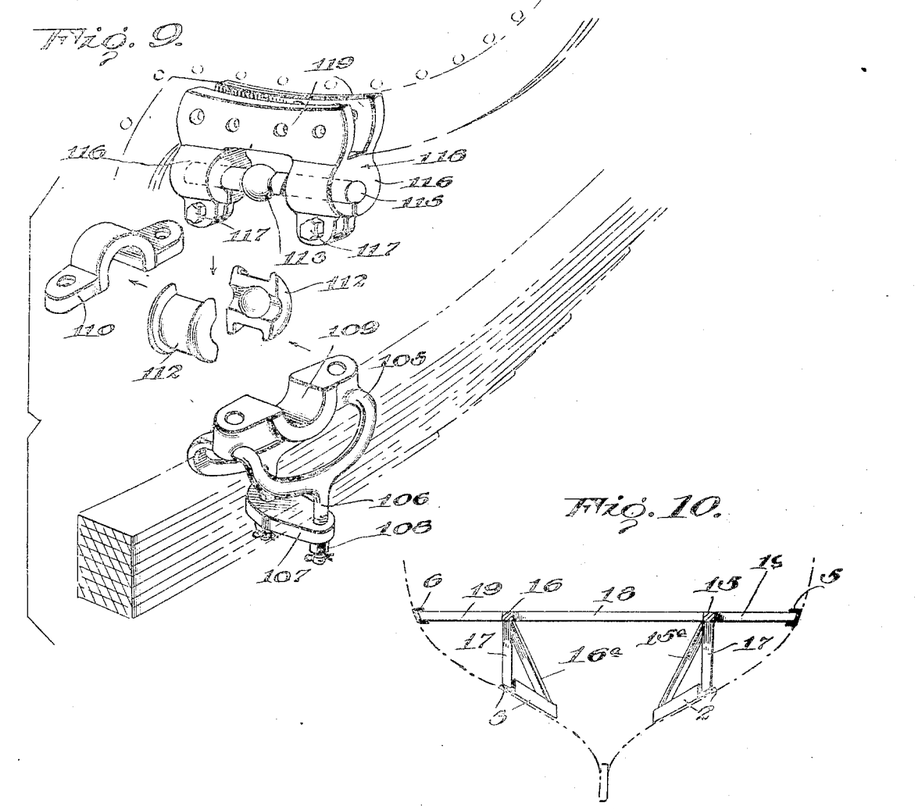
Figure 9 is a detail perspective view showing the rockable connection employed between the front spring and the hull.
Figures 10 and 11 are sectional views on the line 10—10 and 11—11, respectively, of Figure 7.
Figure 11:
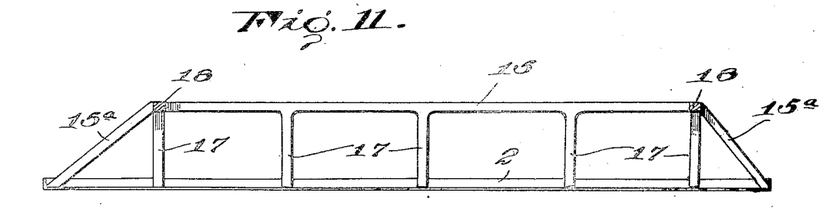

Referring to the drawings the numeral 1 designates generally a hull. The hull preferably includes in its construction keelsons 2 and 3 having their forward end portions 2$^a$ and 3$^a$ converging toward each other and merging into a stem piece 4 provided at the bow of the boat. Rearwardly the keelsons have converging portions 2$^b$ and 3$^b$, respectively, these converging portions having vertical extensions 2$^c$ and 3$^c$ which have diverging end portions 2$^d$ and 3$^d$ at their upper ends, the end portions extending across the stern of the boat as shown in Figure 7. In addition to the keelsons, bilge stringers 5 and 6 are incorporated in the hull structure, the forward ends of the bilge stringers 5 and 6 merging into and being secured to the stem piece 4. Rearwardly the bilge stringers 5 and 6 are offset inwardly, as indicated at 5$^a$ and 6$^a$. Near the stern of the boat other bilge stringers 7 and 8 are provided and are welded to the bilge stringers 5 and 6 and to the keelsons. In fact, all intersecting elements of the framework are preferably welded or otherwise suitably connected together. At this point it is to be noted also that all of the elements of the framework of the hull are constructed of angle iron, channel iron or any other suitable shaped structural elements. A plurality of ribs 10 are provided and traverse the keelsons and bilge stringers and wherever these intersect these elements they are welded thereto. At their upper ends these ribs 10 are fastened to a deck channel or deck stringer 11, said deck stringer or deck channel 11 extending all around the margin of the deck. Steel plates are fastened to the ribs to provide a water-tight plating and the deck is built over the parts of the hull to be covered. In order to stiffen and strengthen the hull and provide a bed for the engine, transmission and the like a pair of spaced and parallel rails, designated at 15 and 16, are provided within the hull and overlie the center portions of the keelsons 2 and 3. At the ends of the rails 15 and 16 downwardly inclining end sections 15$^a$ and 16$^a$ are provided, these end sections being integral with or suitably connected to the rails at one end and to the converging portions of the keelsons at their outer ends. At the juncture of the inclined sections and the main sections of the rails, supports are provided and preferably take the form of posts 17, the posts being secured to the rails and also being secured to the keelsons. These posts may be provided not only at the junctures of the inclined end sections and main sections but also at intermediate points on the main sections. This arrangement provides a bed for the engine of great strength and rigidity as it incorporates the principles of a truss therein. These advantages are had without the addition of any material weight to the hull. For lateral stability cross members 18 extend between and are secured to the side rails 15 and 16 at points where the end sections extend downwardly therefrom. Beyond the cross members brace members 19 are provided, the brace members being fastened to the side rails 15 and 16 and to the bilge stringers 5 and 6. In this way the hull is strengthened and made extremely rigid and the load of the major elements of the power plant are distributed over the major portion of the frame and the hull. The hull is of such cross section that the plating applied to the frame work hereinabove described makes up sides 20, bilges 21 and a flat bottom 22. As shown the bottom although of substantial length, is of a length less than that of the hull over all and is relatively narrow. Bilges incline upwardly and outwardly from the flat bottom and at the bow curve gradually into the stem piece. At the stern of the boat these bilges curve around to a substantially blunt point 23 and they underlie an extended stern which is defined by extensions 24 of the sides 20, as extension bottom 25 and an inclining stern wall 26.

Means is provided for propelling the vehicle when in use in the water as a boat and this means comprises an engine 30 which may be and preferably is an automobile engine. A Ford automobile engine may be used to advantage. This engine is equipped with a sliding gear type of transmission from which transmission clutch-controlled sets of chains and sprocket gearing, designated at 31 and 32, are actuated. The sets of gearing 31 and 32 serve to drive propeller shafts 33 and 34 located at equal distances from the center line of the boat. These shafts 34 and 35 extend out through housings 36 and 37 fastened to the outside of the hull and having stuffing boxes 38 and 39 therein. On the rear ends of the shafts propellers 40 and 41 are fixed. The housings 36 and 37 are fastened to the bilges of the hull at the rear thereof and they are located about midway between the bottom and the sides. This positions the propellers so that liability of ground contact when the vehicle is used on land is precluded, the bottom of the hull striking the ground before the propellers can reach the same. By locating the propellers opposed to the rearwardly and inwardly curving and stream line portions of the bilges the effectiveness of the propellers is increased since the boat is propelled not only by the thrust of the propellers against the water but also by the re-action of the water drawn around the bilges by the propellers, this re-action of the water exerting a forward thrust on the boat and assisting in driving it through the water.

Figures 5, 6:
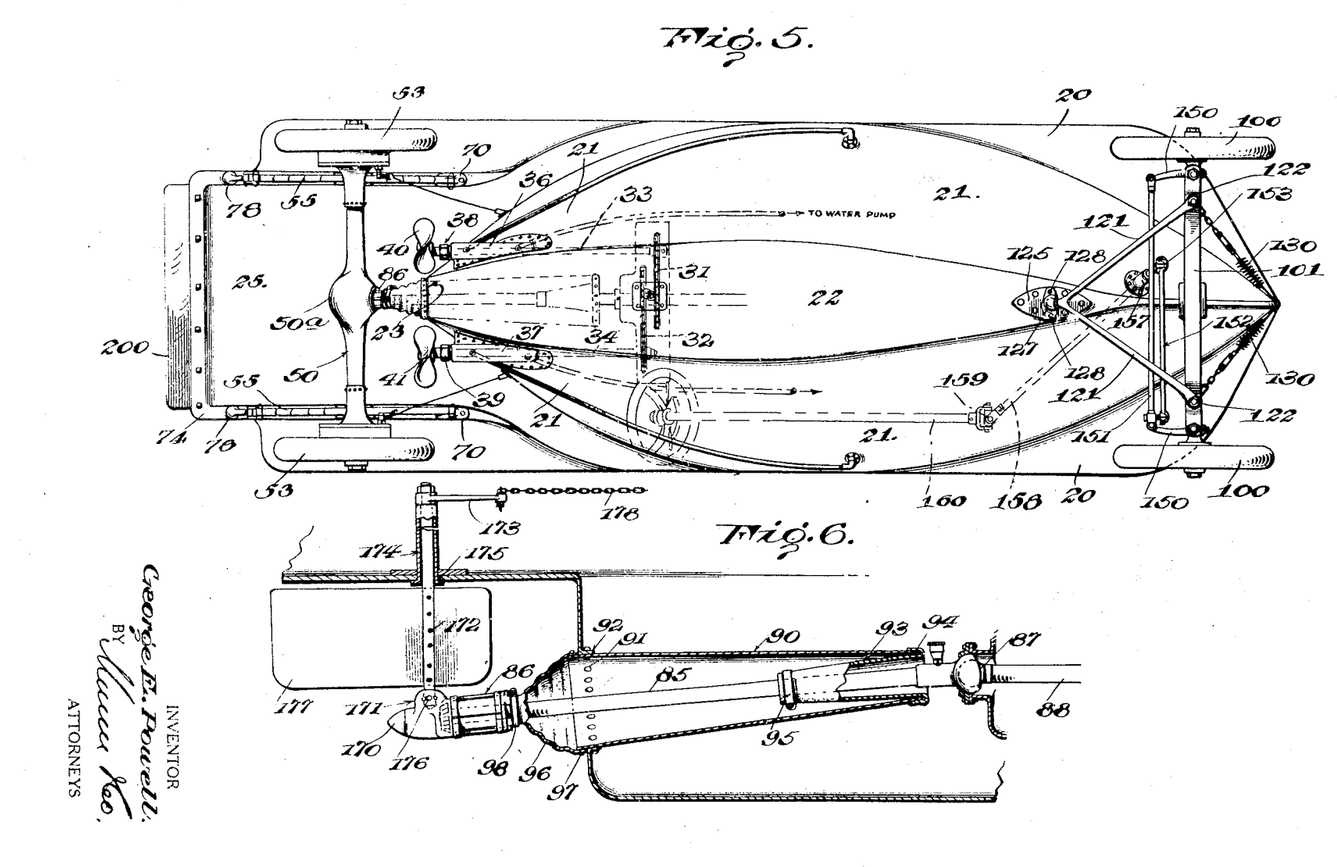
Figure 5 is a bottom plan view of the land and water vehicle shown in Figure 1.
Figure 6 is a fragmentary view partly in central longitudinal section and partly in side elevation showing the means employed for providing a water-tight connection for the torque tube and the drive shaft therein and the means for supporting this torque tube and drive shaft when the device has been converted into a conventional boat.

Running gear is provided for the vehicle and comprises a rear axle assembly 50, the rear axle assembly as shown being the one ordinarily employed on a Ford automobile. This rear axle assembly has the usual spindles 52 driven from the differential and on which the rear wheels 53 are fixed. At each side of the rear axle housing the usual flange 54 is provided and on the flanges 54 semi-elliptical leaf springs 55 are supported. The connection between the springs 55 and flanges 54 includes a bolt 56 having a shoulder 57 abutting one face of the flange. A nut 58 is threaded on the bolt 56 and engages the other face of the flange 54. Inwardly beyond the shoulder 57 a flanged bushing 58 is fitted on the bolt and is held in position by a nut 59 and cotter pin 60. On the upper portion of this flanged bushing a bearing member 61 is supported, the bearing member 61 being held engaged with the bushing by means of a cap plate 62 and screws 63, the screws securing the cap plate 62 to the bearing 61 in such a manner that the cap plate and bearing completely encircle the flanged bushing. A clip 64 is integrally formed with the bearing 61 and has externally threaded studs 65 provided at its upper end. On these studs a clamping plate 66 is fitted, the clamping plate being held down on the top of the spring by nuts 67. One end of each leaf spring 55 is pivotally connected, as at 68, to a bearing member 69 provided on a bracket 70. This bracket 70 has an externally threaded stud 71 which extends up through an opening 72 provided therefor in an outwardly projecting horizontal flange 73 of an angle iron, designated generally at 74. A nut 71ª secures the bracket 71 to the horizontal flange of the angle iron. This angle iron 74 extends around the stern of the hull and has its vertical flange 75 secured, as at 76, to the stern of the hull. The opposite end of each spring has its eye pivotally secured to a shackle connection 77, the links of which shackle connection being pivotally connected to a bracket 78 which may be an inverted spring perch. The bracket 78 has a stud 79 extending upwardly through an opening 80 in the flange 73 of the angle iron and secured to the flange 73 of the angle iron by means of a nut 81. The nut 71ª and 81 may be conveniently secured against accidental displacement by cotter pins, the nuts embodying the usual castellated construction and the studs being provided with the usual transverse aperture. The differential housing of the rear axle assembly is designated at 50ª and this differential housing is releasably connected to the rearward end of a torque tube 85 by means of stud bolts 86. Within the torque tube 85, the usual drive shaft is located and this drive shaft carries at its rear end the usual pinion that meshes with the master gear or ring gear of the differential. As these parts are all of conventional construction they are not illustrated. The forward end of the drive shaft has a universal connection 87 with the rearward end of a driven shaft 88, said driven shaft 88 being actuated from the transmission. The torque tube when the device is in use on land necessarily partakes of considerable vertical and some lateral movement and in order to permit this movement and yet afford a water-tight connection, a casing 90 is provided the casing 90 having its rearward end riveted, as at 91, to the flange 92 of an opening provided therefor in the hull. As shown in Fig. 6 this casing 90 enlarges toward its rearward end and it is preferably approximately of elliptical cross section at its rear although the exact shape of the casing in cross section is immaterial. The forward end of the casing 90 may be reinforced by having its edge rolled around a reinforcing wire and the rearward end of the casing may be lengthwise removed if this is desirable. A flexible and water tight tubular packing element 93 is provided between the forward end of the casing 90 and the torque tube 85, said tubular packing element having one end connected, as at 94, to the casing and having its other end clamped around the torque tube, as indicated at 95. Between the rearward end of the casing 90 and the reaward end of the torque tube a flexible water proof packing element 96 is provided, the packing element 96 having one end fastened, as at 97, to the rearward end of the casing 90 and having its other end clamped about the torque tube, as indicated at 98. The connection of the rearward end of the packing element 98 with the torque tube is located just forwardly of the studs 86 and it is not necessary to disturb this water-tight connection when taking out the studs to disassemble the rear axle assembly from the hull of the boat.

At the bow of the boat steering wheels 100 are provided and are carried on the spindles of the stub axles of a front axle, designated at 101, the mountings of the wheels on the axle being in accordance with the usual practice. A spring 102 overlies the front axle 101 and has its ends connected to perches 103 on the front axle by the usual shackle connections 104. The central portion of the spring 102 has a clip 105 rigidly secured thereto, the clip having studs 106 extending down on the opposite sides of the spring 102 and clamped about the spring by means of a clamping bar 107 and nuts 108. The upper end of this clip 105 is provided with a bearing 109 to which a cap 110 is secured by means of cap screws 111. Between the cap 110 and the bearing 109 a two-part bushing 112 is secured, the bushing 112 defining a substantially spherical socket interiorly although the exterior thereof has the form of the usual flanged cylindrical bushing. Within the spherical socket defined by the bushing 112 a ball 113 formed on a journal pin 115 is fitted. This pin 115 has smooth end portions clamped by pairs of clamping members 116, the clamping members 116 being resilient and being held about the end portions of the pin by bolts and nuts 117. As clearly shown in the drawings these clamping members are parts of a bracket, designated generally at 118, and this same bracket 118 has spaced flanges 119 which embrace the lower portion of the stem piece of the hull. Opposed apertures are provided in the spaced flanges 119 and these opposed apertures of the flanges 119 are aligned with similar apertures in the stem piece of the hull. Bolts and nuts 120 co-act with aligned apertures to releasably fasten the bracket to the hull. It is obvious that the parts just described provide a universal connection between the front spring or the front spring and axle assembly and the hull of the boat. Radius rods 121 are provided below the front axle, the forward ends of the radius rods being fixedly secured, as at 122, to the front axle. The rearward ends of the radius rods join and just beyond their juncture a ball 123 is integral therewith. This ball 123 is fitted in a socket 124 when the running gear is associated with the hull, the socket 124 being formed in a bracket 125 riveted, as at 126, to the hull. A cap 127 holds the ball in the socket 124, the cap being fastened to the bracket 125 by cap screws 128.

For the purpose of limiting the rocking movement of the hull relative to the front axle when the vehicle is in use as a land vehicle and also for the purpose of evenly suspending the front unit of the running gear on the hull when the device is in the water, elastic connections 130 are provided between the upper portion of the stem piece of the hull and the opposite ends of the axle. As clearly shown in the drawings there are two of these connections 130, one extending from the upper portion of the stem piece out to one of the spring perches at one side of the axle and the other extending from the same portion of the stem piece to the opposite spring perch or opposite side of the axle. The connections 130 are of identical construction and each includes a loop 131 engaged with one of the spring perches 103. The loop 131 is connected by a link 132 with an eye 133 of a turnbuckle 134. The turnbuckle 134 has its other eye engaged with a U-shaped frame 135 which extends through a coil spring 136. The ends of the U-shaped frame 135 have hooks 135$^a$ which engage with the convolutions of the coil spring at one end thereof. An oppositely disposed substantially U-shaped frame 137 is also provided and extends in through the coil spring and has hooks 138 engaged with the opposite end convolutions from those engaged by the hooks 135$^a$. This frame 137 terminates in a bar 139 which has a hook 140 extending through and interengaged with an aperture 141 in the stem piece of the hull. The hook 140 may be held against accidental displacement from the opening 141 of the stem piece by means of a cotter pin extended through a transverse opening provided in the hook 140. The convolutions of the coil spring 146 are normally spaced and the spring resists compression. When, however, the hull sways to one side or the other it tends to compress the coil spring of one of the flexible connections. This compression is resiliently resisted by the coil spring until it has been carried out to such an extent as to bring the convolutions of the coil spring into engagement with each other at which time further elongation of the flexible connection is prevented and swaying movement of the hull is positively resisted.

The steering wheels 100 have the sleeves which embrace the spindle bolts provided with the usual arms 150 connected by the usual tie rod 151. To the tie rod the usual drag link 152 has a readily demountable socket 153 at one end which embraces a ball 154 provided on the crank arm 155 carried on the end of a shaft 156 which projects through a stuffing box 157 provided therefor on the hull. The outer end of this shaft has a nut 158 threaded thereon which nut serves to hold the crank arm 155 on the outer tapered end portion of the shaft 156. When the nut 158 is detached the arm 155 may be slipped off of the shaft 156 and the portion of the shaft 156 which projects beyond the hull may be protected by applying a suitable cap thereto. The shaft 156 is connected by a universal joint 159 with the steering column 160, at the upper end of which the usual steering wheel 161 is provided.

Figure 1:
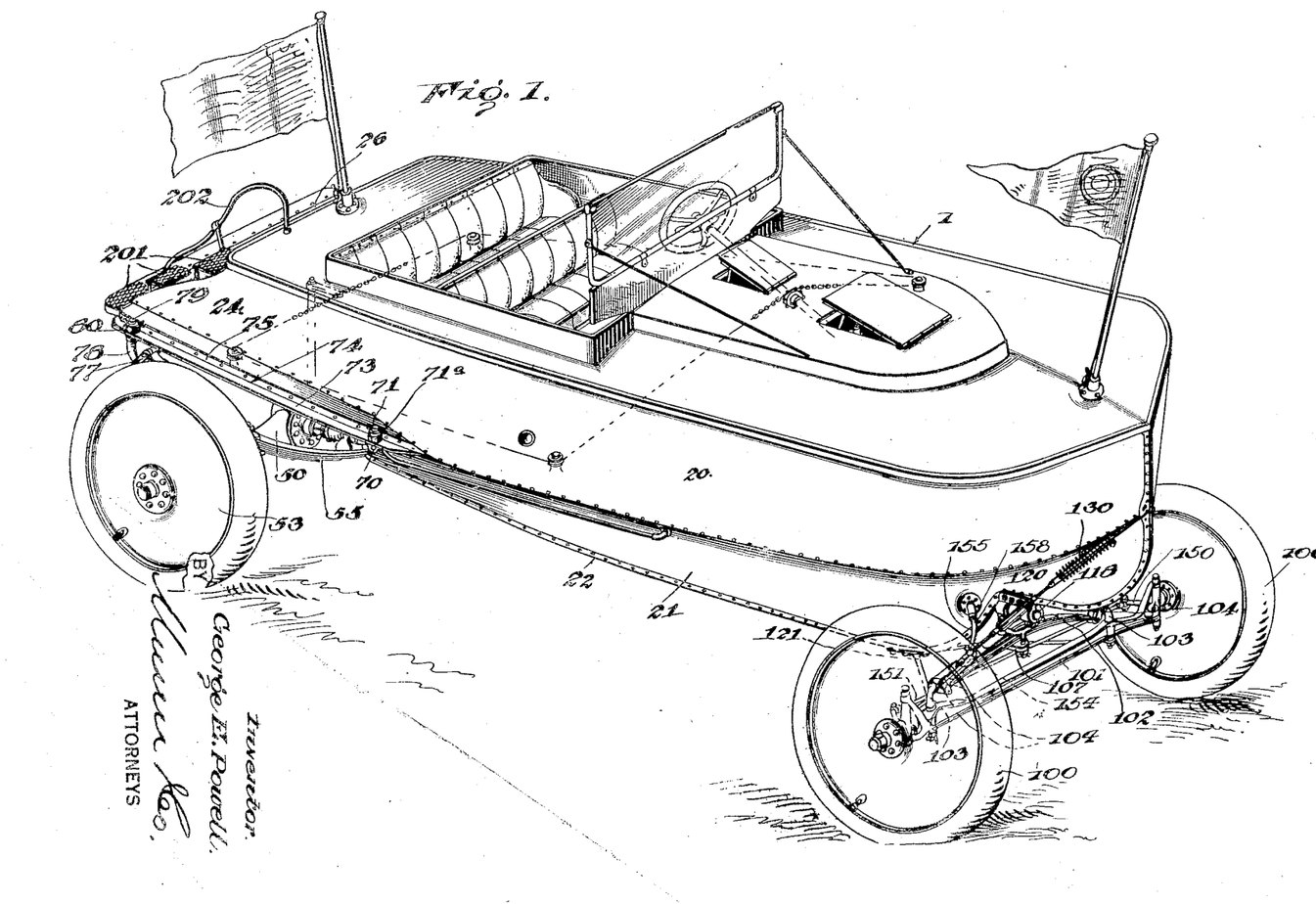
Figure 1 is a perspective view showing a vehicle embodying the present invention.
Figure 2:
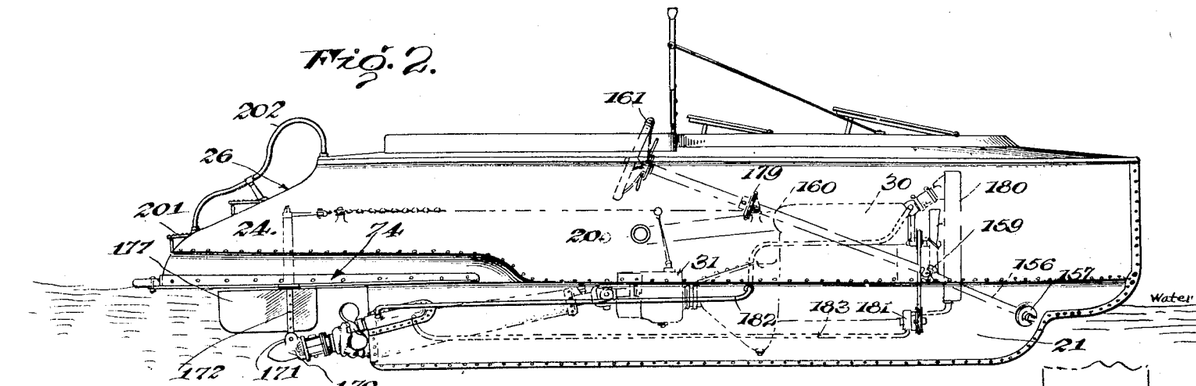
Figure 2 is a view in side elevation showing the vehicle converted into the standard type of boat, parts being shown in dotted lines for the sake of illustration.
Figure 3:
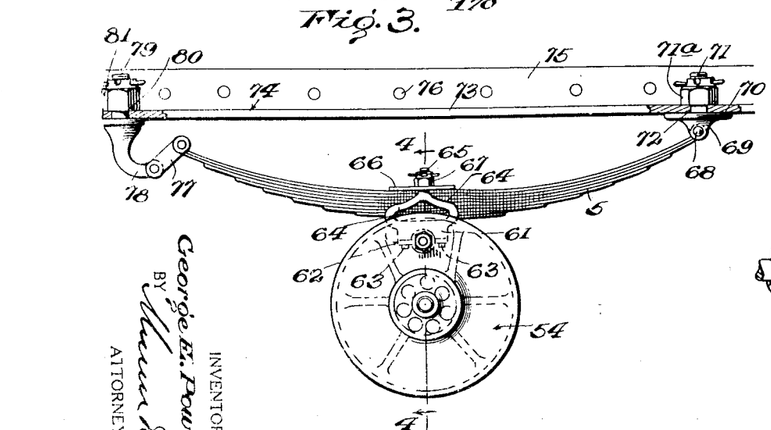
Figure 3 is a fragmentary detail view partly in section and partly in elevation showing how each side of the rear axle housing is mounted on the hull of the boat.
Figure 4:
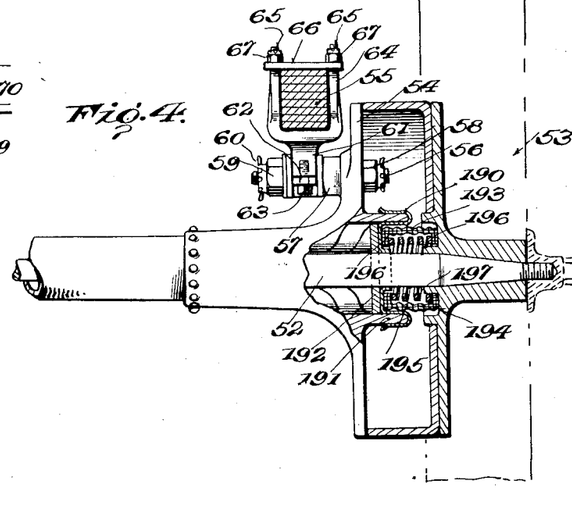
Figure 4 is a sectional view on the line 4—4 of Figure 3.

To convert the vehicle from a combination land and water vehicle to a conventional type of boat it is necessary only to remove the nut 158, take out the four nuts and bolts 120, thereby detaching the bracket 118 from the hull, disengage the hooks 140 from the stem piece and take off the cap plate 127 to disconnect the radius rod from the hull. The entire front axle assembly then comes away from the hull as a unit. The rear axle assembly may be as easily taken from the hull by simply taking out the stud bolts 86 and disconnecting the two nuts 81 and the two nuts 71ª. The entire axle assembly may then be removed as a unit from the hull. In order to facilitate the application and removal of the front and rear axle assemblies the sand may be heaped up or banked up below the flat portion of the bottom of the hull of the boat so that this flat bottom rests on the bank of sand when the running gear is being taken away from the hull of the boat. Of course, when the boat is being changed back from a conventional type of boat to a combination land and water vehicle it will have to be jacked up to permit of this banking of the sand or to permit of the application of the running gear. It is to be noted that the application and removal of the running gear does not interfere with or necessitate making or breaking of any water tight joints, all water tight joints being preserved in proper condition at all times. The pinion which is carried by the rear end of the drive shaft and which is exposed by the disassociation of the rear axle assembly is housed and protected by a cap 170 which is held in position by studs 86. The cap 170 has its upper portion provided with a vertically and horizontally apertured lug 171 and through the vertical aperture of this lug 171 a steering post 172 extends. The steering post 172 is suspended on the hull by virtue of the engagement of its tiller arm 173 with the upper end of a supporting and packing sleeve 174 carried by the hull and having a stuffing box 175 at its lower end. In this way the rudder post is supported or suspended on the hull and it is also used to support the torque tube in position since its lower end is engaged with the lug 171. As pointed out the lower end of the rudder post extends through the vertical aperture of the lug 171 and it is held associated with the lug by means of a horizontally extending pin 176 which passes through the horizontal aperture of the lug and through a transverse aperture provided in the post 172. A rudder 177 is carried by the rudder post in the usual manner. The tiller arm 173 may be controlled from the steering column by means of chains 178 connected with the tiller arm, trained around suitable pulleys and meshed with a sprocket wheel 179 fixed to the steering column and turnable therewith.

The engine 30 may be water cooled and is preferably provided with a conventional radiator 180 having the usual hose connections with the water jacket of the engine. A pump 181 is provided for circulating the water and in order to afford the auxiliary cooling necessary when the vehicle is being propelled through the water, the water jacket of the engine has pipe lines 182 connected thereto, the pipe lines running out through the hull of the boat below the water line to the propeller shaft housings 36 from the propeller shaft housings to the pipe lines 183, returning to the pump, all the pipe lines 183 merging together before being connected with the inlet of the pump. This affords the necessary additional cooling and also serves as an indicator to show whether or not the packing in the housings 36 is water tight. For instance, when the vehicle is used on land an inspection of the housings 36 will show whether or not they are leaking and if they are this condition can be corrected before the boat is run into the water. It is to be understood that the water flows through a space in the housing 37 to which the packing or stuffing box 39 is adjacent.

In order to prevent the water from entering the rear axle assembly and corroding or otherwise injuring the parts thereof each end of the axle housing has a flanged cup 190 seated therein, the cup extending around the end 191 of the axle housing and having its bottom resting against a washer 192 which engages the bearing thereof. A flexible water tight packing member 193 is interposed between the cup 190 and the adjacent portion 194 of the wheel. This packing member 193 has a cylindrical body 195 and inturned flanges 196 at its ends. Within the body 195 a light coil spring 197 is positioned, the ends of the spring engaging the flanges 196 and pressing them outwardly against the washer and wheel, respectively. Preferably this packing member is made of woven asbestos or other tough and strong flexible material which resists wear and the action of heat and it is preferably loaded with graphite. When so constructed and arranged these packing members effectively prevent ingress of water into the rear axle assembly.

A buffer or bumper 200 is carried by the angle iron 74, the buffer 200 being constituted of a heavy wooden bar which may be faced with leather, rubber, or other cushioning material. Preferably this buffer has sufficient horizontal extent to afford a step.

When the vehicle is in use as a land vehicle it is difficult to get into and out of the same and in order to minimize this difficulty the sloping rear wall of the hull is used to advantage as a support or base for a series of steps 201 along one side of which a hand rail 202 is provided.

I claim:—

1. A land and water vehicle including a hull having means for propelling it in water, and running gear for mounting and driving the hull on land including a pair of driving wheels connected to the stern of the hull, a pair of steering wheels at the bow, manually controlled means for operating the steering wheels, a suitably supported spring, a universal connection between the spring and the bow of the hull, an axle for said steering wheels, elastic connections between the hull and said axle, and radius rods connecting the axle with the hull.

2. A land and water vehicle comprising a hull having a flat, relatively narrow bottom, upwardly and outwardly inclined bilges merging into each other at the bow and stern, and upright sides, means for propelling the hull in water including propellers operable in the space opposed to the bilges, and located below the sides and above the flat bottom whereby road contact of the propellers is precluded when the vehicle is run on land and running gear for mounting and driving the hull on land.

3. A land and water vehicle including a hull having means for propelling the same in water, and running gear for mounting and driving the hull on land and including a pair of driving wheels connected to the stern of the hull, a pair of steering wheels at the bow, a front axle having stub axles on which the steering wheels are rotatably mounted, manually controlled means for operating the steering wheels, a spring overlying the axle and connected therewith, a universal connection between the spring and the bow of the hull, a pair of elastic connections between the opposite sides of the hull and spaced points on the axle, radius rods having the forward ends rigidly connected to spaced points on the axle, and a universal connection between the rearward end of the radius rods and the hull.

4. A land and water vehicle including a hull having means for propelling the same in water, and running gear for mounting and driving the same on land and including a pair of driving wheels at the stern of the hull, a driving axle assembly operatively connected with the rear wheels, a pair of springs having their intermediate portions pivoted to the driving axle assembly and their end portions connected to the hull at spaced points on the hull, a pair of steering wheels at the bow, a front axle and spring assembly on which the steering wheels are mounted, means affording a rockable connection between the front axle and spring assembly and the bow of the hull, and yieldable means for limiting the rocking of said front axle and spring assembly.

5. A land and water vehicle including a hull having means for propelling the same in water, a running gear for mounting and driving the same on land and including a pair of driving wheels at the stern of the hull, a driving axle assembly operatively connected with the rear wheels, a pair of springs having their intermediate portions pivoted to the driving axle assembly and their end portions connected to the hull at spaced points on the hull, means for transmitting the drive to the driving axle assembly including a drive shaft having a universal mounting within the hull and projecting rearwardly beyond the same, a casing mounted on the hull and enclosing the major portion of the shaft, a flexible water tight connection between the forward end of the casing and the shaft, a bearing member for the rearward end of the shaft fixed to the driving axle, and a flexible water tight connection between the bearing member and the rearward end of the casing, a pair of steering wheels at the bow, a front axle assembly on which the steering wheels are mounted, means affording a rockable connection between the front axle assembly and the bow of the hull and yieldable means for limiting the rocking of said front axle assembly.

6. A boat adapted to be converted to a land vehicle and comprising a hull, means for propelling the hull in the water, a rudder at the stern of the boat, a rudder post for the rudder means for supporting the upper end of the rudder post on the hull, and releasable means at the lower end of the rudder post adapted to support and house the rearward end of a drive shaft of land running gear.

7. A land and water vehicle including a hull, running gear for mounting and driving the hull on land including a pair of driving wheels at the stern of the hull, a driving axle assembly operatively connected with the wheels, a pair of springs having their intermediate portions pivoted to the driving axle assembly, an angle iron extending around and fixed to the hull, brackets having releasable connections with the angle iron, pivotal connections between the brackets and ends of the springs, a pair of steering wheels at the bow, a front axle carrying the steering wheels, a front spring overlying and connected to the front axle, a releasable universal connection between the front spring and the bow of the hull, and yieldable means for limiting the rocking movement of the front axle.

8. A land and water vehicle comprising a hull having means for propelling the same in water and running gear for mounting and driving the hull on land and including a pair of drive wheels connected to the stern of the boat, a pair of steering wheels at the bow, a front axle on which the steering wheels are rotatably mounted, manually controllable means for operating the steering wheels from within the hull, a spring overlying the axle and connected thereto, a bracket having spaced flanges embracing a portion of the hull, means for releasably fastening the flanges to the portion of the hull embraced therebetween, a clip secured to the front springs, a universal connection between the clip and the bracket, a pair of elastic connections between the opposite sides of the hull at spaced points on the axle, each elastic connection having one end releasably fastened to the hull, radius rods having their forward ends rigidly connected to spaced points on the axle, and a detachable universal connection between the rearward end of the radius rods and the hull.

9. A land and water vehicle comprising a hull having means for propelling the same in water and running gear for mounting and driving the hull on land, a pair of drive wheels at the stern of the hull, a driving axle assembly operatively connected with the rear wheels, a pair of springs having their intermediate portions fixed to the driving axle assembly, means for releasably connecting the ends of the springs to the hull, a pair of steering wheels at the bow, a front axle on which the steering wheels are rotatably mounted, manually controllable means for operating the steering wheels within the hull, springs overlying the axle and connected thereto, a bracket having spaced flanges embracing a portion of the hull, means for releasably fastening the flanges to the portion of the hull embraced therebetween, a clip secured to the front springs, a universal connection between the clip and the bracket, a pair of elastic connections between the opposite sides of the hull at spaced points on the axle, each elastic connection having one end releasably fastened to the hull, radius rods having their forward ends rigidly connected to spaced points on the axle, and a detachable universal connection between the rearward end of the radius rods and the hull.

10. A land and water vehicle comprising a hull having means for propelling the same in water and running gear for mounting and driving the hull on land, a pair of drive wheels at the stern of the hull, a driving axle assembly operatively connected with the rear wheels, a pair of springs having their intermediate portions fixed to the driving axle assembly, means for releasably connecting the ends of the springs to the hull, and including angle irons fastened to the hull and brackets releasably connected to the angle irons and pivotally and permanently connected to the ends of the springs, a pair of steering wheels in the bow, a front axle on which the steering wheels are rotatably mounted, manually controllable means for operating the steering wheels within the hull, springs overlying the axle and connected thereto, a bracket having spaced flanges embracing a portion of the hull, means for releasably fastening the flanges to the portion of the hull embraced therebetween, a clip secured to the front springs, a universal connection between the clip and the bracket, a pair of elastic connections between the opposite sides of the hull at spaced points on the axle, each elastic connection having one end releasably fastened to the hull, radius rods having their forward ends rigidly connected to spaced points on the axle, and a detachable universal connection between the rearward end of the radius rods and the hull.

11. A land and water vehicle including a hull having means for propelling the same in water and consisting of a pair of propellers arranged on opposite sides of the longitudinal center line of the hull, and running gear for mounting and driving the hull on land and including a pair of driving wheels at the stern of the hull, a driving axle assembly connected with said driving wheels, a pair of springs having their intermediate portions pivoted to the driving axle assembly and having their end portions pivotally connected to the hull at spaced points thereon, a torque tube located between the propellers and having a drive shaft therein operatively connected with the driving axle assembly, a water tight casing for the torque tube, said driving axle assembly having a detachable connection with the torque tube just rearwardly of the water tight casing, a pair of steering wheels at the bow, a front axle carrying the steering wheels, a front spring overlying and connected to the front axle, a releasable universal connection between the front spring and the hull, yieldable means for limiting the rocking movement of the front axle, and manually controllable means for operating the steering wheels.

12. A land and water vehicle comprising a hull having a flat, relatively narrow bottom, upwardly and outwardly inclined bilges merging into each other at the bow and stern, and upright sides, means for propelling the hull in water including propellers operable in the space opposed to the bilges, and located below the sides and above the flat bottom whereby road contact of the propellers is precluded when the vehicle is run on land and running gear for mounting and driving the hull on land, and including a pair of rear wheels at the stern, a driving axle assembly connected with the rear wheels, a pair of springs having their intermediate portions connected to the driving axle assembly, means for releasably connecting the end portions of the springs to the hull at spaced points on the hull, means for transmitting motion to the driving axle assembly, a pair of steering wheels at the bow, a front axle and spring assembly on which the steering wheels are mounted, means for operating the steering wheels from within the hull, means affording a rockable connection between the front axle and spring assembly and the bow of the hull, and yieldable means for limiting the rocking of said front axle and spring assembly.

13. A land and water vehicle including a hull, said hull having keelsons and bilge stringers incorporated therein, and a bed for the power plant including side rails overlying the keelsons and having downwardly inclining end sections connected with the keelsons, posts between the keelsons and the side rails, and braces between the side rails and the bilge stringers, whereby the side rails and posts form a truss to provide a bed of rigid and strong construction to strengthen and stiffen the hull.

14. A land and water vehicle including a hull, running gear for mounting and driving the hull on land including a pair of driving wheels at the stern of the hull, a driving axle assembly operatively connected with the wheels, packing members between the wheels and driving axle assembly including expanded flexible elements co-operable with the driving axle assembly and with the wheels to prevent the ingress of water, a pair of springs connected with the wheels and with the hull, a spring and axle assembly at the front of the hull, steering wheels carried by said spring and axle assembly, manually controllable means operating the steering wheels from within the hull, means affording a universal connection between the spring and axle assembly and the hull, and means for limiting the movement of the spring and axle assembly.

15. A land and water vehicle including a hull having means for propelling the same in water and consisting of a pair of propellers arranged on opposite sides of the longitudinal center line of the hull, and running gear for mounting and driving the hull on land and including a pair of driving wheels at the stern of the hull, a driving axle assembly connected with said driving wheels, a pair of springs having their intermediate portions pivoted to the driving axle assembly and having their end portions pivotally connected to the hull at spaced points thereon, a torque tube located in between the propellers and having a drive shaft therein operatively connected with the driving axle assembly, a water tight casing for the torque tube, said driving axle assembly having a detachable connection with the torque tube just rearwardly of the water tight casing, an engine located within the hull, the transmission driven from the engine, a driving connection between the transmission and the propellers, driving connection between the transmission and the drive shaft, a pair of steering wheels at the bow, a front axle carrying the steering wheels, a front spring overlying and connected to the front axle, a releasable universal connection between the front spring and the hull, yieldable means for limiting the rocking movement of the front axle, and manually controllable means for operating the steering wheels.

16. In a land and water vehicle including a hull having means for propelling the same in water and consisting of a pair of propellers arranged on opposite sides of the longitudinal center line of the hull, and running gear for mounting and driving the hull on land and including a pair of driving wheels at the stern of the hull, a driving axle assembly connected with said driving wheels, a pair of springs having their intermediate portions pivoted to the driving axle assembly and having their end portions pivotally connected to the hull at spaced points thereon, a torque tube located in between the propellers and having a drive shaft therein operatively connected with the driving axle assembly, a water tight casing for the torque tube, said driving axle assembly having a detachable connection with the torque tube just rearwardly of the water tight casing, an engine located within the hull, the transmission driven from the engine, a driving connection between the transmission and the propellers, driving connection between the transmission and the drive shaft, said engine having the usual radiator and fan cooling means and also having auxiliary cooling means consisting of pipe lines running along the outside of the hull and operatively connected with the pump of the cooling system, a pair of steering wheels at the bow, a front axle carrying the steering wheels a front spring overlying and connected to the front axle, a releasable universal connection between the front spring and the hull yieldable means for limiting the rocking movement of the front axle, and manually controllable means for operating the steering wheels.

GEORGE E. POWELL.